(12) United States Patent
Yoon et al.

(10) Patent No.: US 12,455,252 B2
(45) Date of Patent: Oct. 28, 2025

(54) DEVICE AND METHOD FOR EVALUATING HEAT RESISTANCE PROPERTIES OF SEPARATOR

(71) Applicant: LG ENERGY SOLUTION, LTD., Seoul (KR)

(72) Inventors: Dong Sik Yoon, Daejeon (KR); Ji Hyun Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 474 days.

(21) Appl. No.: 17/914,418

(22) PCT Filed: Nov. 17, 2021

(86) PCT No.: PCT/KR2021/016898
§ 371 (c)(1),
(2) Date: Sep. 26, 2022

(87) PCT Pub. No.: WO2022/131583
PCT Pub. Date: Jun. 23, 2022

(65) Prior Publication Data
US 2023/0104062 A1 Apr. 6, 2023

(30) Foreign Application Priority Data
Dec. 17, 2020 (KR) .................. 10-2020-0177344

(51) Int. Cl.
*G01N 25/18* (2006.01)
*H04N 23/23* (2023.01)

(52) U.S. Cl.
CPC ............ *G01N 25/18* (2013.01); *H04N 23/23* (2023.01)

(58) Field of Classification Search
CPC ..................................................... G01N 25/18
See application file for complete search history.

(56) References Cited

U.S. PATENT DOCUMENTS

| | | | |
|---|---|---|---|
| 2020/0220139 A1 | 7/2020 | Lee et al. | |
| 2023/0323061 A1 | 10/2023 | Lee et al. | |

FOREIGN PATENT DOCUMENTS

| | | |
|---|---|---|
| CN | 201252133 Y | 6/2009 |
| CN | 203396878 U | 1/2014 |
| CN | 108152756 A | 6/2018 |
| CN | 110926966 A | 3/2020 |
| CN | 210294131 U | 4/2020 |

(Continued)

OTHER PUBLICATIONS

International Search Report (with partial translation) and Written Opinion dated Mar. 2, 2022 issued in corresponding International Patent Application No. PCT/KR2021/016898.

(Continued)

*Primary Examiner* — Mirellys Jagan
(74) *Attorney, Agent, or Firm* — Morgan, Lewis & Bockius LIP

(57) ABSTRACT

The present invention relates to an apparatus and method for evaluating a heat-resisting property of a separator. The apparatus for evaluating a heat-resisting property of a separator includes: a separator fixing unit at which a target separator is fixed; a nail which is positioned to be perpendicular to the separator on one surface of the separator and penetrates the separator by a vertical movement; a heating unit which heats the nail; and a temperature measuring unit which measures a temperature of the separator penetrated by the nail.

19 Claims, 11 Drawing Sheets

(56) References Cited

FOREIGN PATENT DOCUMENTS

| | | |
|---|---:|---:|
| CN | 111108630 A | 5/2020 |
| JP | 2006-156229 A | 6/2006 |
| JP | 2013-190220 A | 9/2013 |
| JP | 2014-032173 A | 2/2014 |
| JP | 2017-174704 A | 9/2017 |
| JP | 2019-015701 A | 1/2019 |
| JP | 2019-090802 A | 6/2019 |
| JP | 2019-185893 A | 10/2019 |
| KR | 10-0504182 B1 | 8/2005 |
| KR | 10-1764299 B1 | 8/2017 |
| KR | 10-2020-0030023 A | 3/2020 |
| WO | 2014/179355 A1 | 11/2014 |

OTHER PUBLICATIONS

Extended European Search Report dated Sep. 4, 2023 in corresponding European Patent Application No. 21906888.9.
Office Action dated Apr. 29, 2025 issued in Chinese Patent Application No. 202180023683.0.

[FIG. 9A]
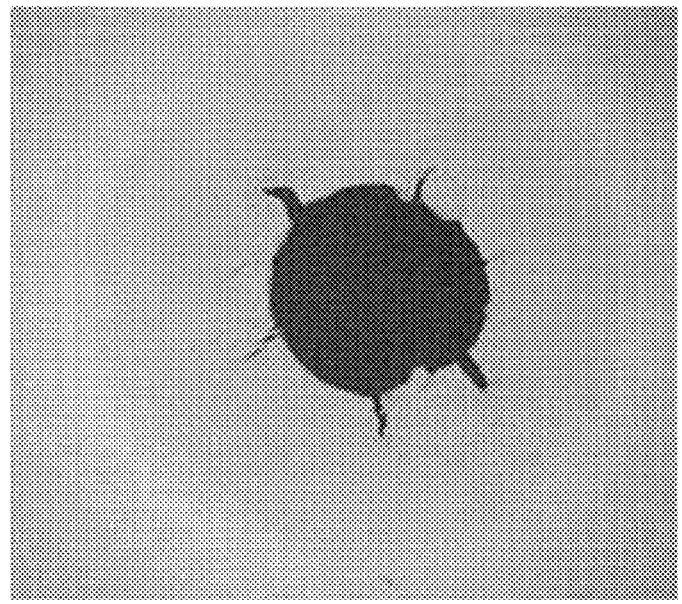
[FIG. 9B]
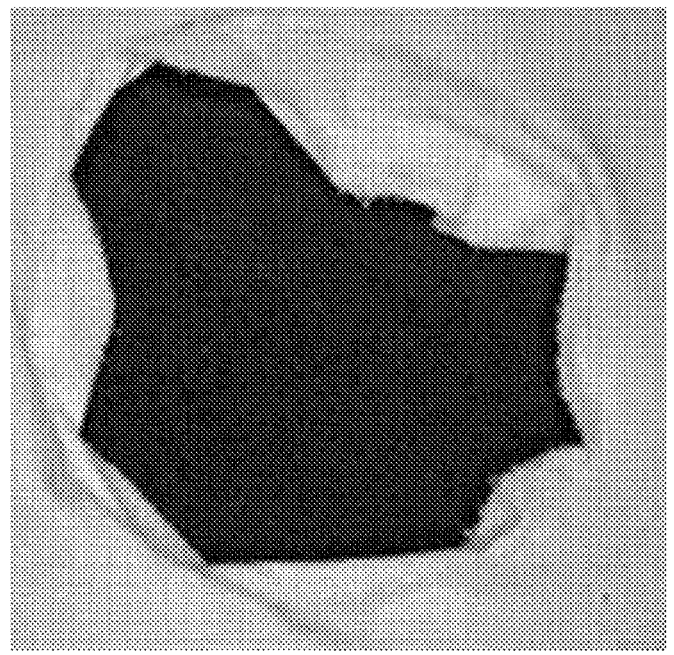

[FIG. 10A]
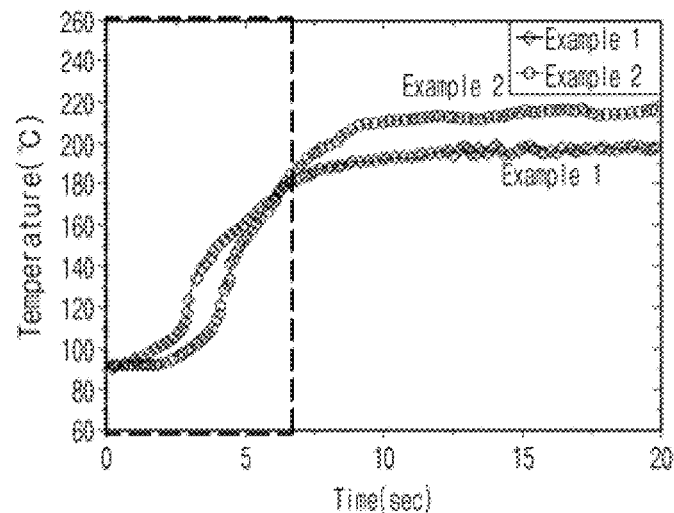
[FIG. 10B]
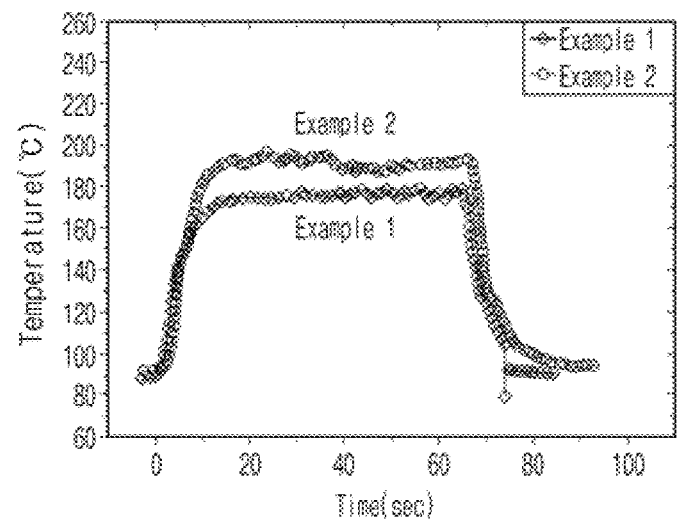

[FIG. 10C]
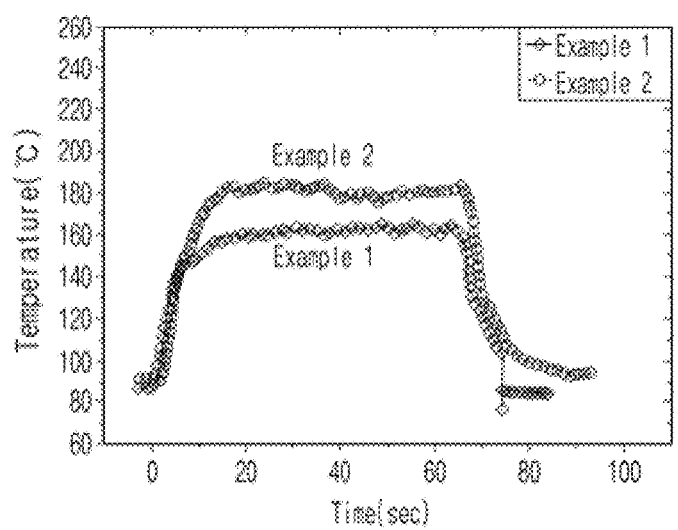

DEVICE AND METHOD FOR EVALUATING HEAT RESISTANCE PROPERTIES OF SEPARATOR

CROSS-REFERENCE TO RELATED APPLICATION

This application claims the benefit of priority based on Korean Patent Application No. 10-2020-0177344, filed on Dec. 17, 2020, and the entire contents of the Korean patent application are incorporated herein by reference.

TECHNICAL FIELD

The present invention relates to an apparatus for evaluating a heat-resisting property of a separator, and a method of evaluating a heat-resisting property of a separator.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

The separator is used to provide a path for an electrolyte solution and lithium ions in a battery and to block a contact between a positive electrode and a negative electrode. The separator is generally made of a porous polymer material such as polyethylene or polypropylene.

Further, in order for such a lithium secondary battery to be used, there is a need for safety improvement. Particularly, when heat is rapidly generated in the secondary battery or there is a physical impact to the secondary battery, a short circuit may occur due to the damage of the separator. Hence, the heat-resisting property and impact-resisting property of the separator need to be measured.

Conventionally, the shape of a hole, which was formed by allowing iron, which was heated to a high temperature, to contact a separator, was observed. However, if such iron is used, it is difficult to apply heat to each point of the separator for the same period of time, and there is a problem in the pressure and temperature uniformity applied to the separator. Hence, in the case that holes are generated by heating the separator with iron, the shapes of the holes are not constant, and accordingly, it is difficult to evaluate heat-resisting properties, and the thermal characteristics of the separator should be analyzed based on the area of the penetrated portion, and accordingly, it is impossible to check thermal conduction characteristics of the separator.

Hence, there is a need for a technology capable of checking heat-resisting properties of a separator, specifically thermal conduction properties of the separator.

DISCLOSURE

Technical Problem

The present invention is believed to solve at least some of the above problems. For example, an aspect of the present invention provides an apparatus for evaluating a heat-resisting property of a separator, which is capable of easily adjusting the temperature and pressure applied to a separator and thereby verifying a heat transfer behavior and displaying the verified information in diagram form, and a method of evaluating a heat-resisting property of a separator.

Technical Solution

An apparatus for evaluating a heat-resisting property of a separator includes: a separator fixing unit at which a target separator is fixed; a nail which is positioned to be perpendicular to the separator on one surface of the separator and penetrates the separator by a vertical movement; a heating unit which heats the nail; and a temperature measuring unit which measures a temperature of the separator penetrated by the nail.

In a specific example, the heating unit may include: a body into which the nail is inserted and which is made of a heat-resisting material; a coil which heats the nail in the body; and a temperature control unit which adjusts a temperature of the nail.

The nail has a structure surrounded by the coil in a state that one end of the nail has been inserted into the body.

In a specific example, the temperature measuring unit includes a thermal imaging camera.

The thermal imaging camera may be installed at a predetermined angle with the nail and the separator.

The apparatus for evaluating a heat-resisting property of a separator according to the present invention may further include a controller which controls movement time, a movement distance, and a moving speed of the nail.

Further, the apparatus for evaluating a heat-resisting property of a separator according to the present invention may further include a data processing unit which receives measurement data transmitted from the temperature measuring unit, and extracts temperature distribution data of the separator from the measurement data.

The data processing unit may extract a temperature according to a distance between a point of the separator, at which the nail has penetrated, and a measurement point, and a change of a temperature of the measurement point over time.

At this time, a distance between the point, at which the nail has penetrated, and the measurement point is calculated by a following formula 1:

$$x = \frac{d \times \cos(90° - \theta)}{\cos\theta}$$ [Formula 1]

Herein, the x denotes a distance between the point, at which the nail has penetrated, and the measurement point, the d denotes a length of a portion at which the nail has penetrated the separator, and the θ denotes an angle between the nail and a straight line connecting the temperature measuring unit to the point at which the nail has penetrated.

Further, the present invention provides a method of evaluating a heat-resisting property of a separator.

A method of evaluating a heat-resisting property of a separator according to the present invention includes: fixing a separator; heating a nail and moving the nail in a direction perpendicular to the separator to thereby penetrate the separator; and measuring a temperature of the separator penetrated by the nail.

In a specific example, a temperature of the separator penetrated by the nail may be measured by a thermal imaging camera.

In a specific example, the measuring of the temperature of the separator penetrated by the nail may be performed by extracting temperature distribution data of the separator from measurement data.

At this time, the temperature distribution data of the separator may include a temperature according to a distance between a point of the separator, at which the nail has penetrated, and a measurement point, and a change of a temperature of the measurement point over time.

At this time, a distance between the point, at which the nail has penetrated, and the measurement point may be calculated by a following formula 1:

$$x = \frac{d \times \cos(90° - \theta)}{\cos\theta}$$ [Formula 1]

Herein, the x denotes a distance between the point, at which the nail has penetrated, and the measurement point, the d denotes a length of a portion at which the nail has penetrated the separator, and the θ denotes an angle between the nail and a straight line connecting the temperature measuring unit to the point at which the nail has penetrated.

Further, the method of evaluating a heat-resisting property of a separator according to the present invention may further include measuring a shape and a size of a portion lost or deformed by penetration of the nail.

Advantageous Effects

According to the present invention, it is possible to easily adjust the temperature and pressure applied to a separator and thereby verify a heat transfer behavior and display the verified information in diagram form by allowing a nail, which has been heated to a predetermined temperature, to penetrate the separator and measuring the temperature of the separator.

BRIEF DESCRIPTION OF THE DRAWINGS

FIGS. 9A and 9B are photographs showing the result of evaluating heat-resisting properties according to the method of an example and a comparative example.

FIGS. 10A to 10C are graphs showing a temperature change of each point of a separator over time according to example 1 and example 2.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

Figure 1:
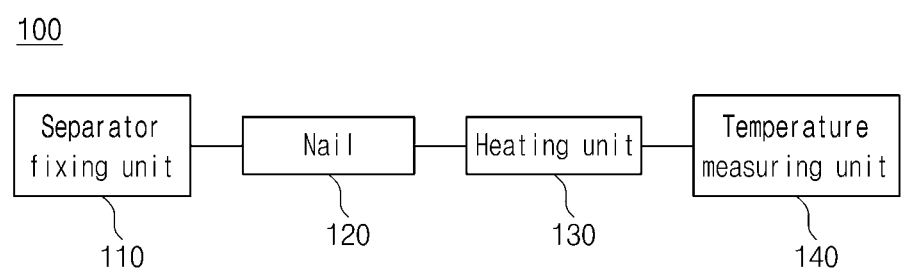
FIG. 1 is a block diagram showing the configuration of an apparatus for evaluating a heat-resisting property of a separator according to the present invention.

FIG. 1 is a block diagram showing the configuration of an apparatus for evaluating a heat-resisting property of a separator according to the present invention.

Referring to FIG. 1, an apparatus 100 for evaluating a heat-resisting property of a separator according to the present invention includes: a separator fixing unit 110 at which a target separator is fixed; a nail 120 which is positioned to be perpendicular to the separator on one surface of the separator and penetrates the separator by a vertical movement; a heating unit 130 which heats the nail; and a temperature measuring unit 140 which measures a temperature of the separator penetrated by the nail.

Conventionally, the shape of a hole, which was formed by allowing iron, which was heated to a high temperature, to contact a separator, was observed. However, if such iron is used, it is difficult to apply heat to each point of the separator for the same period of time, and there is a problem in the pressure and temperature uniformity applied to the separator. Hence, in the case that holes are generated by heating the separator with iron, the shapes of the holes are not constant, and accordingly, it is difficult to evaluate heat-resisting properties, and the thermal characteristics of the separator should be analyzed based on the area of the penetrated portion, and accordingly, it is impossible to check thermal conduction characteristics of the separator.

According to the present invention, it is possible to easily adjust the temperature and pressure applied to a separator and thereby verify a heat transfer behavior and display the verified information in diagram form by allowing a nail, which has been heated to a predetermined temperature, to penetrate the separator and measuring the temperature of the separator.

Figure 2:
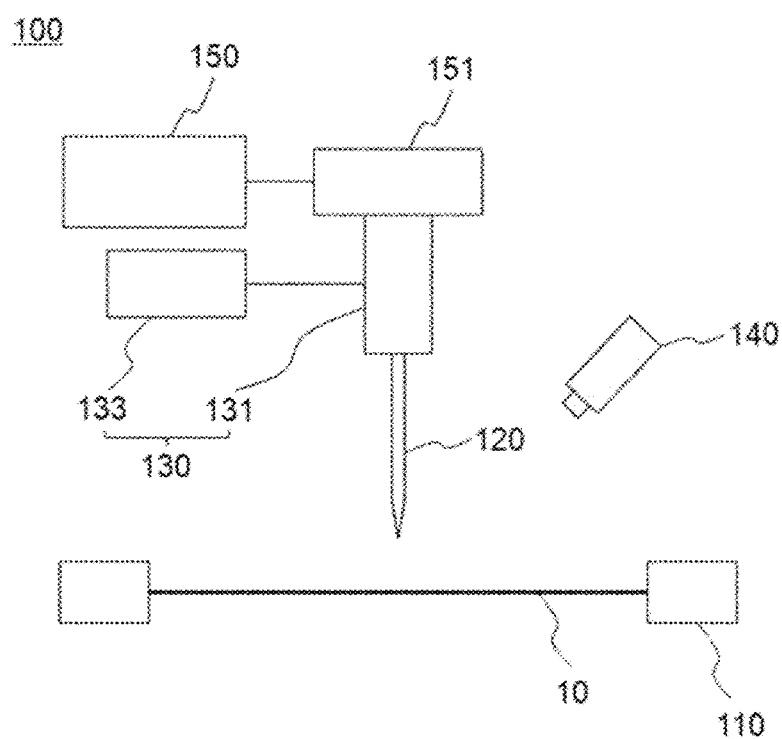
FIG. 2 is a schematic diagram showing the configuration of an apparatus for evaluating a heat-resisting property of a separator according to the present invention.

FIG. 2 is a schematic diagram showing the configuration of an apparatus 100 for evaluating a heat-resisting property of a separator according to the present invention.

Referring to FIG. 2, the fixing unit 110 of the separator fixes the target separator 10 in order to prevent the movement of the target separator 10 during the penetration of the nail 120.

There is no particular limitation to the structure of the separator fixing unit 110 as long as it can fix the separator and allow the nail to penetrate the separator by supporting the separator. For example, a separator may be fixed as a gripper is positioned at both ends of the target separator. At this time, it is possible to prevent the separator from being stretched in a nail-moving direction by the pressure from the nail by additionally including a sample rod (not shown) provided on the lower surface of the separator to allow the separator to be mounted thereon. Since an empty space or hole is formed on the path, where the nail is moved, in the sample rod, the nail may completely penetrate the separator.

Alternatively, the separator fixing unit 110 may be composed of a lower sample rod positioned on the lower surface of the separator and an upper sample rod positioned on the upper surface of the separator. In this case, the separator may be fixed between the lower sample rod and the upper sample rod. Likewise, when the nail is moved in the upper sample rod and the lower sample rod, an empty space or hole is formed on the path, and accordingly, the nail may completely penetrate the separator without interference with the movement of the nail.

Figure 3:
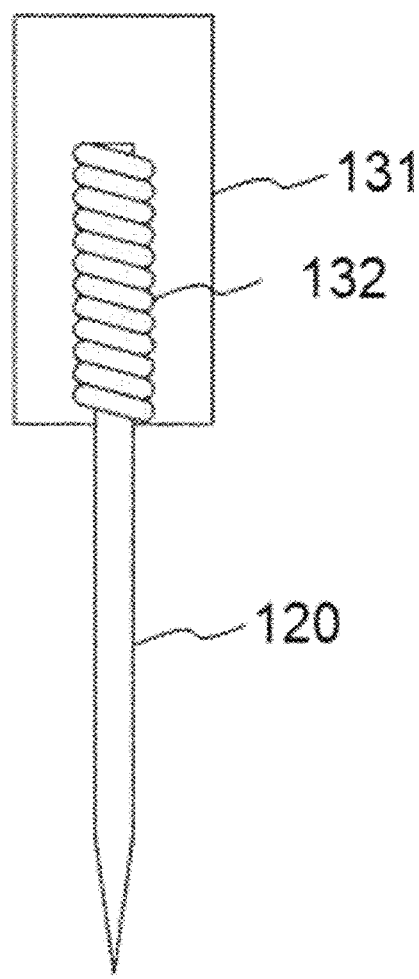
FIG. 3 is a schematic diagram showing a structure of a nail and a heating unit.

FIG. 3 is a schematic diagram showing a structure of a nail 120 and a heating unit 130.

Referring to FIG. 2 together with FIG. 3, the nail 120 is positioned to be perpendicular to the separator 10 on one surface of the separator 10 and penetrates the separator 10 by a vertical movement. The nail 120 is composed of a tip part having a sharp end for penetrating the separator 10, a handle part which is the body of the nail and penetrates the separator, and a head part which is the opposite end of the tip part. The handle part and the handle part preferably have a cylindrical shape in order to accurately measure the diameter of the hole formed by penetration, and the tip part preferably has a conical shape. As will be described later, the nail 120 is heated by the heating unit 130 and is made of a metal material in which heat transfer is easy, and there is no other particular limitation to the type of the nail 120 as long as it can maintain rigidity at a heating temperature range. In the present invention, it is possible to penetrate the separator at the uniform speed and pressure to measure the thermal properties of the separator by using a nail 120 to heat the separator instead of conventional electric iron. Further, since the cross-sectional area of the nail-shaped penetration material is smaller than the electric iron, it is possible to accurately observe the pattern in which heat is transferred from the penetration point, and as will be described later, it is possible to observe the region where the pore is clogged in the separator at the time of nail penetration.

Further, the heating unit 130 heats the nail 120 to reach a predetermined temperature. The heating unit 130 may directly contact the nail 120 in order to easily heat the nail 120. Referring to FIGS. 2 and 3, the heating unit 130 includes: a body 131 into which the nail 120 is inserted and which is made of a heat-resisting material; a coil 132 which heats the nail 120 in the body; and a temperature control unit 133 which adjusts a temperature of the nail 120.

Specifically, the body 131 supports the nail 120 at the upper end, and at the same time fixes the coil 132 and the nail 120. The nail 120 has a structure which is surrounded by the coil 132 in a state that one end of the nail 120 has been inserted into the body 131. A movement unit 151 for adjusting the vertical movement of the nail 120 may be coupled to the head portion of the nail 120. Since the nail 120 has been heated to a high temperature, the movement unit 151 may be damaged by the temperature of the nail 120. In order to prevent the damage, the body 131 of the heating unit 130 surrounds the head portion of the nail 120, thereby preventing heat transfer to the movement unit 151. The body 131 may be made of a heat-resisting material, and there is no limitation to the material as long as it can effectively block heat generated in the nail. The heat-resisting material may include a ceramic material selected from the group consisting of aluminum oxide ($Al_2O_3$), magnesium oxide (MgO) and calcium oxide (CaO). The body 131 may have a structure including an insertion groove into which a nail and a coil may be inserted, and may have a structure in which the body is integrally formed to cover the coil and the head portion of the nail in a state that the coil has covered the head portion of the nail.

Various types of heating means may be used to heat the nail 120 in the heating unit 130. For example, a coil types, which surrounds the nail 120, may be used. The coil 132 may have a form which surrounds the head portion of the nail 120 and be positioned in the body 131 of the heating unit 130. The same kind as that of known heat wire may be used as the coil 132. For example, Ni—Cr-based heat wire or Fe—Cr-based heat wire may be used.

A temperature control unit 133 is connected to the coil 132 in order to adjust the temperature of the nail 120. The temperature control unit 133 may indirectly adjust the temperature of the nail 120 by adjusting the temperature of the coil 132. Specifically, the temperature control unit 133 may induce heat generation by the resistance of the coil 132 by allowing the electric current to flow on the coil 132. The temperature control unit 133 may adjust the temperature of the coil 132 by adjusting the intensity of the current flowing on the coil 132.

Further, the nail 120 may be heated to a high temperature in order to induce deformation of the separator by heat. For example, the nail 120 may be heated to 200 to 400° C., specifically 250 to 350° C.

The apparatus 100 for evaluating a heat-resisting property of a separator may further include a controller 150 which controls movement time, a movement distance, and a moving speed of the nail 120. The controller 150 may be connected to the movement unit 151 which is connected to the nail 120 and moves the nail 120 in a vertical direction, to thereby control the operation of the movement unit 151. In the present invention, there is no particular limitation to the type of the movement unit 151 as long as it can vertically move the nail 120 and the heating unit 130. For example, the nail can be vertically moved by the air pressure supplied by a pneumatic cylinder or rotation of a motor. In this way, the size and time of the pressure applied to the separator 10 may be controlled.

Figure 4:
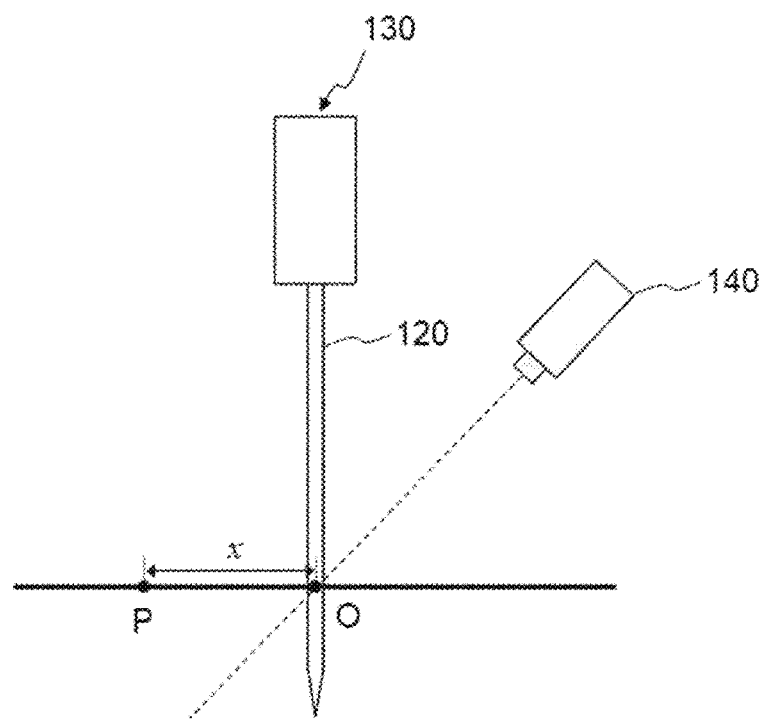
FIG. 4 is a schematic diagram showing a situation that a nail has penetrated a separator.
Figure 5:
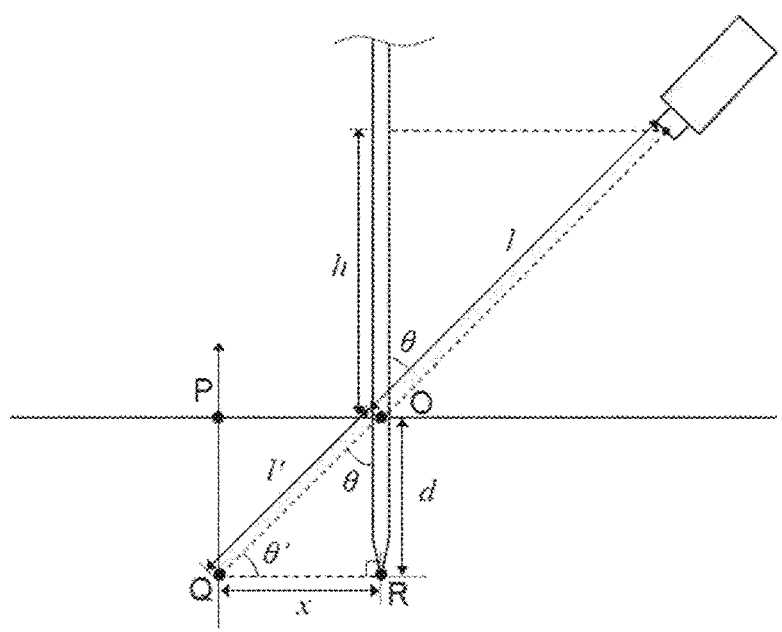
FIG. 5 is an enlarged view of a point at which the separator has been penetrated in FIG. 4.

FIG. 4 is a schematic diagram showing a situation that a nail has penetrated a separator, and FIG. 5 is an enlarged view of a point at which the separator has been penetrated in FIG. 4.

Referring to FIGS. 2 and 4, the nail 120 penetrates the separator (target separator 10) in a state that has been heated by the heating unit 130. In this way, the nail 120 contacts the separator at the penetration point, and heat emitted from the nail 120 is delivered to the point near the separator 10 from the penetration point O of the nail. The apparatus 100 for evaluating a heat-resisting property of a separator according to the present invention includes a temperature measuring unit 140 which measures a temperature of the separator penetrated by the nail in order to observe heat-resisting properties of the separator, such as thermal conductivity. The temperature measuring unit 140 monitors the change in temperature of each point of the separator 10.

In a specific example, the temperature measuring unit 140 includes a thermal imaging camera. Unlike a general thermometer, the thermal imaging camera may measure the temperature of the entire region of the measurement object as well as one point of the measurement object by taking the temperature distribution of the entire measurement object as one screen. The thermal imaging camera is installed at a predetermined angle with the nail and the separator. At this time, the angle between the thermal imaging camera and the nail or the separator may be used to calculate the distance between the measurement point and the penetration point on the thermal image as will be described later.

This may be helpful to evaluation of heat-resisting properties, specifically heat transfer properties of a separator. This is because, in the case that the nail 120 has penetrated the separator 10, heat is transferred from the penetration point of the nail to its surrounding region, and the heat transfer speed may be different according to the direction in which heat is transferred even at points spaced apart from the penetration point O by the same distance due to the coated state of the material coated on the separator or the pore structure in the separator. Hence, when using a thermal imaging camera, it is easy to verify a heat transfer pattern, compared to the case of using a thermometer.

The thermal imaging camera detects the surface temperature distribution of the separator by consecutively and sequentially photographing the surface of the separator over time. If the surface of the separator is photographed using the thermal imaging camera, the temperature distribution by regions can be confirmed through colors. This makes it possible to simultaneously measure the temperature of two or more points of the measurement object. Further, since the consecutive temperature measurement between respective points is possible by using the thermal imaging camera, it is possible to intuitively or qualitatively grasp the temperature distribution of the entire region of the measurement object. Specifically, as shown in FIGS. 9A and 9B, high temperature points show relatively red color, and low temperature points show relatively green or blue color. Namely, it is possible to intuitively verify the heat transfer speed and the temperature difference according to the distance from the penetration point of the separator through the thermal imaging camera.

If a thermal image is obtained from the thermal imaging camera the thermal image is analyzed. To this end, the apparatus 100 for evaluating a heat-resisting property of a separator according to the present invention further includes a data processing unit (not shown) which receives measurement data transmitted from the temperature measuring unit 140, and extracts temperature distribution data of the separator from the measurement data.

As explained above, if a thermal imaging camera is used, it is possible to obtain an image which shows difference of color development according to the temperature, which allows the temperature distribution on the surface of the separator to be qualitatively measured, but it is difficult to perform a quantitative analysis on a specific numerical value of the temperature, etc. Further, there may be an error in evaluation, depending on the observer's viewpoint when only the image taken by the thermal imaging camera is used, and there is a limit to automating the separator evaluation. The data processing unit extracts a temperature according to a distance between a point of the separator, at which the nail has penetrated, and a measurement point, and a change of a temperature of the measurement point over time.

Specifically, the data processing unit extracts temperature data according to a distance between a point of the separator, at which the nail has penetrated, and a measurement point, and temperature data of the measurement point over time by storing images taken by the thermal imaging camera in predetermined frame or time units and converting the images into specific numerical values of the temperature.

At this time, in order to accurately evaluate the heat-resisting property of the separator, it is necessary to accurately measure the position of the measurement point, that is, the distance between the measurement point P and the point O at which the nail has penetrated. It is because, since the thermal imaging camera is tilted to the separator at a predetermined angle, it is difficult to measure the accurate point of the distance between the measurement point P and the point O at which the nail has penetrated based on only what is shown in the thermal image. Herein, since the nail has been heated to a high temperature as described above, it is difficult to measure the distance between the measurement point and the penetration point by the approach of a worker in a situation that the nail has penetrated the separator. Hence, in the present invention, the distance between the measurement point and the penetration point is indirectly derived by measuring the angle at which the thermal imaging camera (or temperature measuring unit) has been installed, and the length by which the nail has penetrated the separator. The angle, at which the thermal imaging camera is installed, is determined by the direction in which the thermal imaging camera is oriented toward the penetration point O. The measurement point means a point, at which the temperature is measured, on the separator.

Referring to FIG. 5, the distance between the point O, at which the nail has penetrated, and the measurement point P is calculated by a following formula 1:

$$x = \frac{d \times \cos(90° - \theta)}{\cos\theta} \qquad \text{[Formula 1]}$$

Herein, the x denotes a distance between the point, at which the nail has penetrated, and the measurement point, the d denotes a length of a portion at which the nail has penetrated the separator, and the θ denotes an angle between the nail and a straight line connecting the temperature measuring unit to the point at which the nail has penetrated.

The length of a portion at which the nail has penetrated the separator means a distance by which the nail has moved after the end of the nail penetrated the separator.

In the present invention, the angle between the temperature measuring unit (thermal imaging camera) and the nail, and the length of a portion at which the nail has penetrated the separator are values obtained before measurement. At this time, the angle θ between the thermal imaging camera and the nail is the angle between the nail and a straight line connecting the temperature measuring unit to the point at which the nail has penetrated and is calculated by a following formula 1-1:

$$\theta = \cos^{-1}\frac{h}{l} \qquad \text{[Formula 1-1]}$$

Here, θ denotes an angle between the nail and a straight line connecting the temperature measuring unit to the point at which the nail has penetrated, h denotes a distance between the separator and the thermal imaging camera, and l denotes a distance between the thermal imaging camera and the penetration point.

Further, as shown in FIG. 5, when a point, at which a straight line, which connects a thermal imaging camera to a penetration point O, and a vertical line, which passes the measurement point P, meet is defined as Q, and a point, where the end of the nail is positioned, is defined as R, the angle (θ') between the straight $\overrightarrow{OQ}$ line connecting point O to point Q and the straight line $\overrightarrow{QR}$ connecting point Q to point R may be defined as following formula 1-2. The length x of the straight line $\overrightarrow{QR}$ is the same as the distance between the measurement point P and the penetration point Q.

$$\theta'=90°-\theta \qquad \text{[Formula 1-2]}$$

At this time, the relationship between the length l' of the straight line $\overrightarrow{OQ}$ and the length x of the straight line $\overrightarrow{QR}$ is defined as following formula [1-3].

$$\cos\theta' = \cos(90°-\theta) = \frac{x}{l'} \qquad \text{[Formula 1-3]}$$

Further, since the angle between the straight line $\overrightarrow{OQ}$ and the straight line $\overrightarrow{OR}$ is the same as the angle θ between the nail and a straight line connecting the temperature measuring unit to the point at which the nail has penetrated, the length l' of the straight line $\overrightarrow{OQ}$ is defined as following formula 1-4.

$$l' = \frac{d}{\cos\theta} \qquad \text{[Formula 1-4]}$$

Hence, the distance x between the measurement point P and the penetration point Q can be calculated by following formula [1-5].

$$x = l'\cos(90°-\theta) = \frac{d\times\cos(90°-\theta)}{\cos\theta} \qquad \text{[Formula 1-5]}$$

Namely, if there is information on the distance h between the separator and the thermal imaging camera, the distance l between the thermal imaging camera and the penetration point, and the length d of a portion at which the nail has penetrated the separator, it is possible to calculate the distance x between the point, at which the nail has penetrated, and the measurement point.

At this time, the shape of a triangle formed by the penetration point O, point Q and point R should be a right triangle in the method. Hence, if the position of the measured point P is changed, the length d of a portion at which the nail has penetrated the separator should be adjusted so that the shape of a triangle formed by the penetration point O, point Q and point R may become a right triangle. The position adjustment of the nail may be performed by the controller and the movement unit as described above.

Likewise, according to the present invention, it is possible to verify the heat transfer behavior of the separator by allowing the nail to penetrate the separator in a desired length, speed and pressure and evaluate the heat-resisting property of the separator therefrom.

Further, the present invention provides a method of evaluating a heat-resisting property of a separator. The method may be performed by the above-described apparatus for evaluating a heat-resisting property of a separator.

Figure 6:
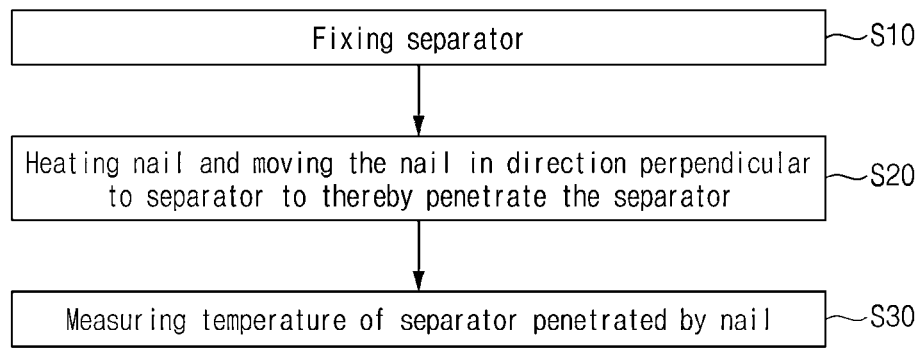
FIG. 6 is a flowchart illustrating an order of a method of evaluating heat-resisting property of a separator according to the present invention.

FIG. 6 is a flowchart illustrating an order of a method of evaluating heat-resisting property of a separator according to the present invention. Referring to FIG. 6, a method of evaluating a heat-resisting property of a separator according to the present invention includes: fixing a separator (S10); heating a nail and moving the nail in a direction perpendicular to the separator to thereby penetrate the separator (S20); and measuring a temperature of the separator penetrated by the nail (S30).

Hereinafter, each process of the method of evaluating a heat-resisting property of a separator according to the present invention will be described in detail.

<Preparation of Separator>

Further, a target separator (separator sample) is prepared. There is no particular limitation to the type of the target separator as long as it can be used for a secondary battery. For example, the separator may be a porous polymer substrate including at least one selected from the group consisting of polyolefin and modified polyolefin. In the case that two or more kinds of polymers are used, they may be mixed in a single layer to thereby form a porous polymer substrate, or a complex layer of two or more layers, in which different polymers form separate layers, may be formed, and at this time, a mixture of two or more kinds of polymers may be included in at least one layer of the complex layer.

At this time, the polyolefin may be formed as one or a mixture of a polyolefin-based polymer such as polyethylene (for example high density polyethylene, linear low density polyethylene, low density polyethylene, ultra-high molecular weight polyethylene, etc.), polypropylene, polybutylene, and polypentene.

The modified polyolefin may be a copolymer of olefin (e.g., ethylene, propylene, etc.) and alpha-olefin having 2 to 20 carbon atoms. The alpha-olefin may have a structure including at least one selected from the group consisting of 1-butene, 1-pentene, 1-hexene, 4-methyl-1-pentene, 1-octene, 1-decene, 1-dodecene, 1-tetradecene, 1-hexadecene, 1-octadecene and 1-eicosene, or including at least one of vinyl group, ketone group, ester group, acid group, etc. in a polymer chain. In the ethylene/alpha-olefin copolymer, the content of the alpha-olefin may be in the range of 0.5 to 10 wt %, preferably 1 to 5 wt %.

The porous polymer substrate may be formed of one or a mixed polymer of polyolefin, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene, etc.

Further, an inorganic coating layer may be further formed on the separator. Since the inorganic coating layer is made of a material having a high electric resistance or a thermal resistance, it is possible to prevent a short circuit which may occur when the separator is damaged, and when heat is generated in the battery, inorganic particles, which absorb heat and lower the temperature, may be used.

At least one selected from the group consisting of $BaTiO_3$, $Pb(Zr,Ti)O_3$(PZT), $Pb_{1-x}La_xZr$—$Ti_yO_3$(PLZT), $PB(Mg_3Nb_{2/3})O_3$—$PbTiO_3$(PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, AlO(OH), $Al_2O_3$—$H_2O$, $TiO_2$, SiC and $Al(OH)_3$ may be used as the inorganic particles.

The inorganic particles may be mixed with the binder and coated on the separator, and any binder, which is generally used in a secondary battery field, may be used. Further, the ratio of the inorganic particles to the binder may be appropriately designed by one of ordinary skill in the art.

<Separator Penetration of Heated Nail>

When a target separator is prepared, a nail is heated and is moved in a direction perpendicular to the separator to thereby allow the nail to penetrate the separator. The details about the nail and the peripheral devices are the same as described above. According to the present invention, it is possible to allow the nail to penetrate the separator through the controller and the movement unit after heating the nail to a desired temperature by generating heat in the coil through the temperature control unit. At this time, it is possible to allow the nail to penetrate the separator in a desired depth, speed and pressure by the controller and the movement unit. The nail may be heated to a high temperature to induce deformation of the separator by heat. For example, the nail may be heated to reach 200 to 400° C., specifically 250 to 350° C.

<Measurement of Temperature of Separator>

Thereafter, the temperature of the separator penetrated by the nail is measured. This may be measured by the thermal imaging camera. The thermal imaging camera can measure the temperature of the entire region of the measurement object by taking the entire temperature distribution of the measurement object. The thermal imaging camera is installed at a predetermined angle with the nail and the separator. At this time, the angle between the thermal imaging camera and the nail or the separator may be used to calculate the distance between the measurement point and the penetration point on the thermal image as will be described later.

Namely, the measuring of the temperature of the separator penetrated by the nail may be performed by extracting temperature distribution data of the separator from measurement data. Specifically, the temperature distribution data of the separator may include a temperature according to a distance between a point of the separator, at which the nail has penetrated, and a measurement point, and a change of a temperature of the measurement point over time.

At this time, a distance between the point, at which the nail has penetrated, and the measurement point is calculated by a following formula 1:

$$x = \frac{d \times \cos(90° - \theta)}{\cos\theta} \qquad \text{[Formula 1]}$$

Herein, the x denotes a distance between the point, at which the nail has penetrated, and the measurement point, the d denotes a length of a portion at which the nail has penetrated the separator, and the θ denotes an angle between the nail and a straight line connecting the temperature measuring unit to the point at which the nail has penetrated.

Further, the angle θ between the thermal imaging camera and the nail is the angle between the nail and a straight line connecting the temperature measuring unit to the point at which the nail has penetrated and is calculated by a following formula 1-1: The method of calculating the distance between the point, at which the nail has penetrated, and the measurement point has been explained above.

$$\theta = \cos^{-1}\frac{h}{l} \qquad \text{[Formula 1-1]}$$

Here, θ denotes an angle between the nail and a straight line connecting the temperature measuring unit to the point at which the nail has penetrated, h denotes a distance between the separator and the thermal imaging camera, and l denotes a distance between the thermal imaging camera and the penetration point.

Namely, according to the present invention, it is possible to verify the heat transfer behavior of the separator by allowing the nail to penetrate the separator in a desired length, speed and pressure and evaluate the heat-resisting property of the separator therefrom.

Further, the method of evaluating a heat-resisting property of a separator according to the present invention may further include measuring a shape and a size of a portion lost or deformed by penetration of the nail.

Figure 7:
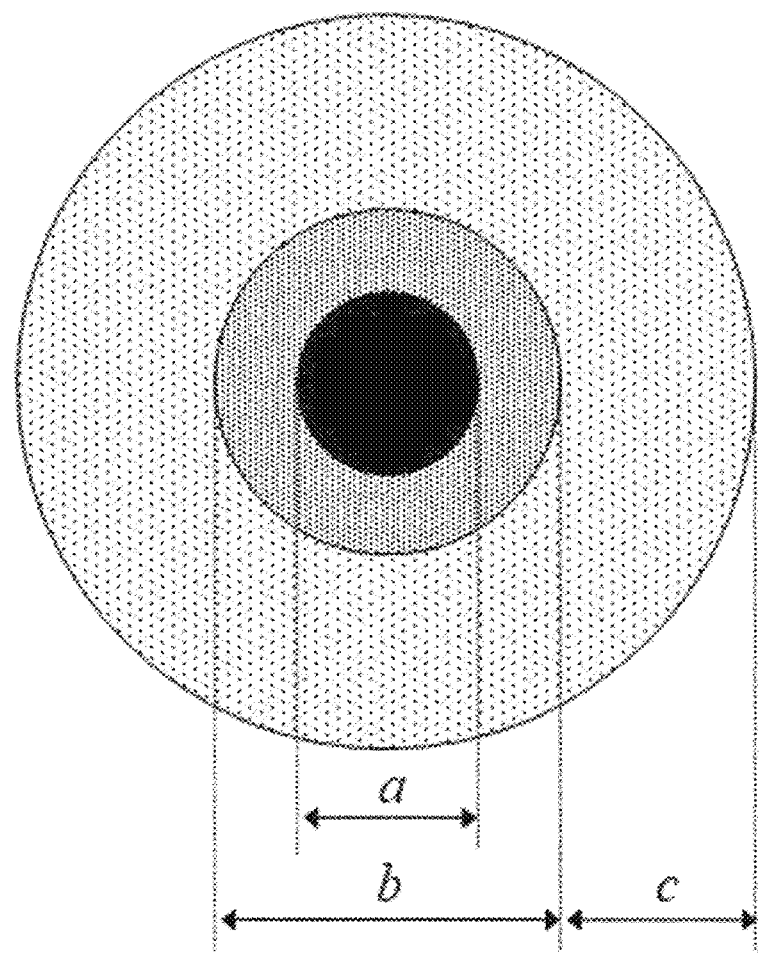
FIG. 7 is an upper surface view schematically illustrating a separator portion at which a nail has penetrated.

Referring to FIG. 7, when the heated nail penetrates the separator, 3 kinds of regions may be formed. A concentric circle shape may be formed based on the center of the penetration.

The most central region among the three kinds of regions is a portion where the separator directly contacts the nail. The diameter "a" of the region is the same as the diameter of the handle part of the nail and is a fixed value.

Further, the region formed at the outer side of the most central region is a region where the separator is lost by heat after penetration of the nail. The diameter "b" of the region is a diameter of a hole region which is formed in a circular shape when observing the separator after test using a microscope. Since a nail having a circular cross-section is used in the present invention, the region is close to a circle, but when the region is not a circle, its area may be determined by converting the region into a circle having the same area and by the diameter of the circle.

Further, the region formed at the outermost side is a pore-clogged region by deformation of the separator by heat and is generated, followed by the lost region of "b", and may be distinguished by the brightness difference, compared to the region where the pores are preserved. This can be measured through an electron microscope or an optical microscope. The length "c" of this portion may be calculated by measuring the length of from the center of the lost region of the circular shape to the circumference of the region where the pore have been clogged after penetration, and then subtracting the radius of the lost region from the measured length, but the present invention is not limited to this example.

Likewise, when measuring a shape and a size of a portion lost or deformed by penetration of the nail, it is possible to obtain more information about heat-resisting properties of a separator.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

The target separator was obtained by coating a 4 μm inorganic coating layer, which contains $Al(OH)_3$ as inorganic particles and PVDF as the binder at the weight ratio of 90:10, on a polyethylene porous film of 37.3% porosity, 9 μm thickness and 7.6 $cm^2$ area. For example, the porosity may be measured using a mercury measurement method according to ASTM D4284-92, and the thickness may be measured using a laser measuring instrument of Orix systems LG-700 series.

The separator was inserted into measuring equipment as shown in FIG. 3. Thereafter, the nail was heated to 300° C., and the nail was made to descend to penetrate the separator by a predetermined length. Thereafter, the temperature change over time of the separator was taken using a thermal imaging camera installed at a predetermined angle. A commercially available thermal imaging camera may be used. It was illustrated in FIG. 8.

Comparative Example 1

Heat was applied to the separator by allowing electric iron to contact the separator used in the example 1.

Experimental Example 1

The shapes of the hole formed on the separator having been penetrated by the nail in the example 1, and the hole formed on the separator having contacted the electric iron in the comparative example 1 were photographed. The results are shown in FIGS. 9A and 9B.

Referring to FIG. 9A, the hole in the case of using a nail was closer to a circle than that in FIG. 9B, the case of using electric iron, and the pore-clogged region was observed as a separator was formed around the hole. When electric iron was used, the shapes of holes were irregular, and it was difficult to observe pore-clogged regions. This was because the separator was penetrated at a uniform speed, pressure and temperature using the heated nail.

Example 2

The heated nail was made to penetrate the separator in the same manner as in the example 1 except that an inorganic coating layer was not formed on a polyethylene porous film as a target separator, and the temperature change of the separator was photographed using the thermal imaging camera.

Experimental Example 2

Three arbitrary measurement points A, B and C were selected for the thermal image obtained in examples 1 and 2, and the temperature change of the points over time was measured. The results are shown in FIGS. 10A to 10C. FIGS. 10A, 10B, and 10C show the temperature change at points A, B and C, respectively. The temperature was obtained by converting color shown in the thermal image into a specific numerical value change of the temperature. At this time, the distance between the measurement point and the point where the nail has penetrated was calculated using formula 1, and the result was shown in FIG. 8.

Figure 8:
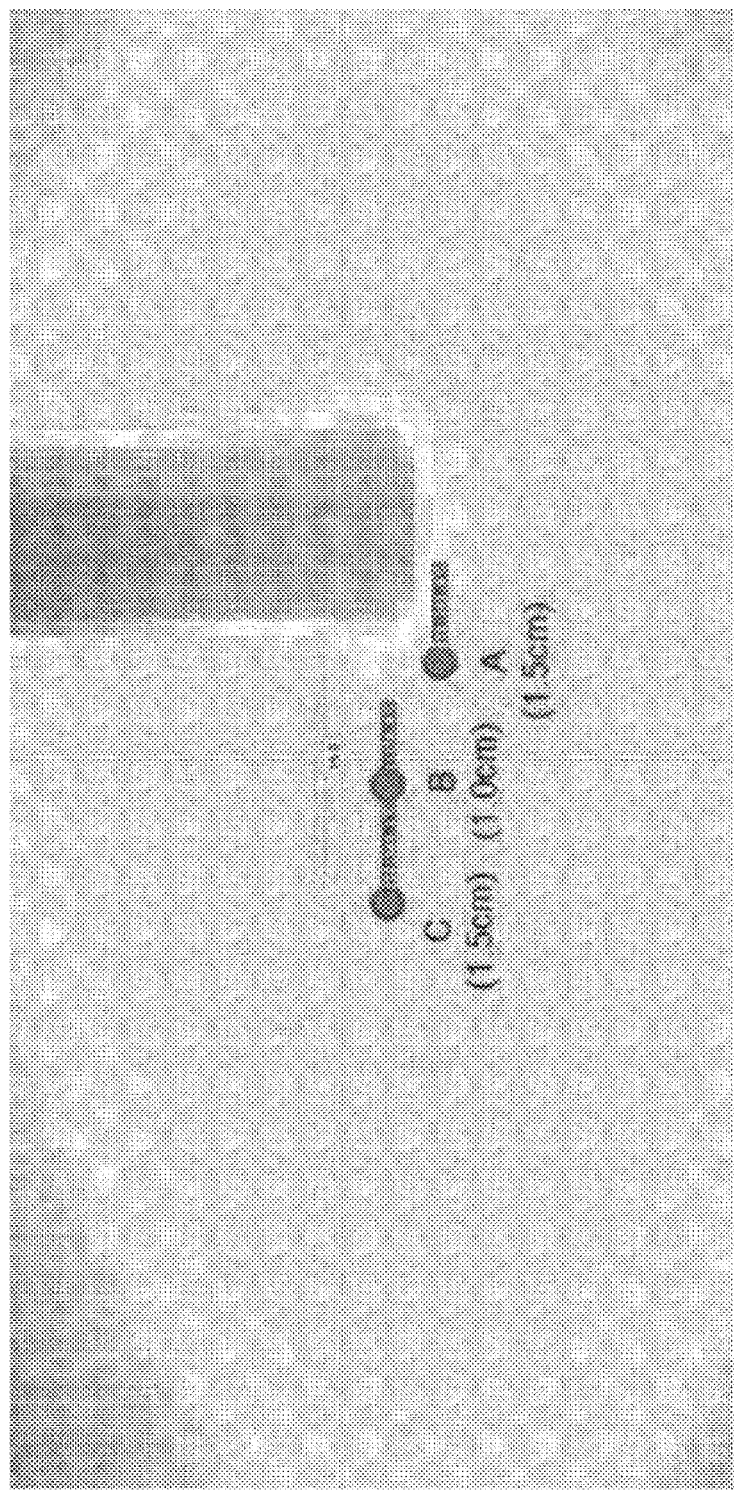
FIG. 8 is a thermal image showing a heat transfer behavior of a separator.

Referring to FIG. 8, the distance between points A, B and C and the penetration point is 1.5 cm, 1.0 cm and 1.5 cm, respectively. Unlike what is shown in the image, the distance between point A and the penetration point was calculated to be the same as the distance between point C and the penetration point, and this was because the thermal imaging camera was tilted to the separator by a predetermined angle. According to the present invention, it is possible to guarantee the safety of the worker by calculating the exact distance using formula 1 without approaching the high temperature nail.

Further, referring to FIGS. 10A, 10B, and 10C, in the case of the example 1 in which an inorganic coating layer was formed on the separator, the heating rate was slower than the example 2 in which an inorganic coating layer was not formed on the separator (see a portion indicated by a dotted line), and the temperature after heating was also lower in the example 1 than in the example 2. This was because $Al(OH)_3$, which was used for the inorganic coating layer, lowered the surrounding temperature and acted as a thermal resistance material to prevent the temperature rise of the separator.

According to the present invention, it is possible to easily adjust the temperature and pressure applied to a separator and thereby verify a heat transfer behavior and display the verified information in diagram form by allowing a nail, which has been heated to a predetermined temperature, to penetrate the separator and measuring the temperature of the separator.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

DESCRIPTION OF REFERENCE NUMERALS

10: separator
100: apparatus for evaluating a heat-resisting property of a separator
110: fixing unit
120: nail
130: heating unit
131: body
132: coil 133: temperature control unit
140: temperature measuring unit
150: controller
151: movement unit

The invention claimed is:

1. An apparatus for evaluating a heat-resisting property of a separator, the apparatus comprising:
 a separator fixing unit configured to fix the separator;
 a nail configured to be positioned to be perpendicular to the separator on one surface of the separator and to penetrate the separator by a vertical movement;
 a heating unit configured to heat the nail; and
 a temperature measuring unit configured to measure a change in temperature of the separator penetrated by the nail to evaluate the heat-resisting property of the separator,
 wherein the temperature measuring unit includes a thermal imaging camera.

2. The apparatus of claim 1, wherein the thermal imaging camera is configured to be installed at an angle with the nail and the separator.

3. The apparatus of claim 1, further comprising a controller configured to control a movement time, a movement distance, and a moving speed of the nail.

4. The apparatus of claim 1, wherein the heating unit includes:
 a body into which the nail is inserted and which includes a heat-resisting material;
 a coil to heat the nail in the body; and
 a temperature control unit configured to adjust a temperature of the nail.

5. The apparatus of claim 4, wherein one end of the nail is inserted into the body, and the nail has a structure surrounded by the coil.

6. The apparatus of claim 1, further comprising a data processing unit configured to receive measurement data transmitted from the temperature measuring unit, and to extract temperature distribution data of the separator from the measurement data.

7. The apparatus of claim 6, wherein the data processing unit is configured to extract a temperature according to a distance between a measurement point and a point of the separator, at which the nail has penetrated, and a change of a temperature of the measurement point over time.

8. The apparatus of claim 7, wherein the distance is calculated by a following formula 1:

$$x = \frac{d \times \cos(90° - \theta)}{\cos\theta} \qquad \text{[Formula 1]}$$

wherein x denotes the distance, d denotes a length of a portion at which the nail has penetrated the separator, and θ denotes an angle between the nail and a straight line connecting the temperature measuring unit to the point at which the nail has penetrated.

9. A method of evaluating a heat-resisting property of a separator, the method comprising:
 fixing the separator;
 heating a nail and moving the nail in a direction perpendicular to the separator to thereby penetrate the separator; and
 measuring a change in temperature of the separator penetrated by the nail to evaluate the heat-resisting property of the separator,
 wherein the change in temperature of the separator penetrated by the nail is measured by a thermal imaging camera.

10. The method of claim 9, further comprising measuring a shape and a size of a portion of the separator lost or deformed by penetration of the nail.

11. The method of claim 9, wherein the measuring of the temperature of the separator penetrated by the nail is performed by extracting temperature distribution data of the separator from measurement data.

12. The method of claim 11, wherein the temperature distribution data of the separator includes a temperature according to a distance between a measurement point and a point of the separator, at which the nail has penetrated, and a change of a temperature of the measurement point over time.

13. The method of claim 12, wherein distance is calculated by a following formula 1:

$$x = \frac{d \times \cos(90° - \theta)}{\cos\theta} \qquad \text{[Formula 1]}$$

wherein x denotes the distance, d denotes a length of a portion at which the nail has penetrated the separator, and θ denotes an angle between the nail and a straight line connecting the temperature measuring unit to the point at which the nail has penetrated.

14. An apparatus for evaluating a heat-resisting property of a separator, the apparatus comprising:
 a separator fixing unit configured to fix the separator;
 a nail configured to be positioned to be perpendicular to the separator on one surface of the separator and to penetrate the separator by a vertical movement;
 a heating unit configured to heat the nail; and
 a temperature measuring unit configured to measure a change in temperature of the separator penetrated by the nail to evaluate the heat-resisting property of the separator,
 wherein the heating unit includes:
  a body into which the nail is inserted and which includes a heat-resisting material,
  a coil to heat the nail in the body, and
  a temperature control unit configured to adjust a temperature of the nail.

15. The apparatus of claim 14, wherein one end of the nail is inserted into the body, and the nail has a structure surrounded by the coil.

16. The apparatus of claim 14, further comprising a controller configured to control a movement time, a movement distance, and a moving speed of the nail.

17. The apparatus of claim 14, further comprising a data processing unit configured to receive measurement data transmitted from the temperature measuring unit, and to extract temperature distribution data of the separator from the measurement data.

18. The apparatus of claim 17, wherein the data processing unit is configured to extract a temperature according to a distance between a measurement point and a point of the separator, at which the nail has penetrated, and a change of a temperature of the measurement point over time.

19. The apparatus of claim 18, wherein the distance is calculated by a following formula 1:

$$x = d \times \cos(90° - \theta)/\cos\theta \qquad \text{[Formula 1]}$$

wherein x denotes the distance, d denotes a length of a portion at which the nail has penetrated the separator, and θ denotes an angle between the nail and a straight line connecting the temperature measuring unit to the point at which the nail has penetrated.

* * * * *